United States Patent [19]

Weiler et al.

[11] Patent Number: 4,832,161
[45] Date of Patent: May 23, 1989

[54] PIN GUIDING AND/OR DAMPING SLEEVE FOR FLOATING-CALIPER SPOT-TYPE DISC BRAKES

[75] Inventors: Rolf Weiler, Frankfurt am Main; Wolfgang Endler, Hofheim, both of Fed. Rep. of Germany

[73] Assignee: Alfred Teves GmbH, Frankfurt am Main, Fed. Rep. of Germany

[21] Appl. No.: 102,461

[22] Filed: Sep. 29, 1987

[30] Foreign Application Priority Data

Oct. 1, 1986 [DE] Fed. Rep. of Germany ....... 3633337

[51] Int. Cl.$^4$ ............................................. F16D 65/00
[52] U.S. Cl. .................................. 188/73.44; 74/18.2; 277/DIG. 4; 384/16
[58] Field of Search ............. 188/73.44, 73.45, 322.17; 74/18.2; 277/DIG. 4, 212 FB; 384/16

[56] References Cited

U.S. PATENT DOCUMENTS

| 3,995,502 | 12/1976 | Jones | 277/212 FB X |
| 4,261,443 | 4/1981 | Wright | 188/73.44 X |
| 4,265,341 | 5/1981 | Kuramoto | 188/73.44 |
| 4,276,759 | 7/1981 | Faulbecker | 277/212 FB X |

FOREIGN PATENT DOCUMENTS

| 2125117 | 12/1972 | Fed. Rep. of Germany | 74/18.2 |
| 2915080 | 10/1979 | Fed. Rep. of Germany | 188/73.45 |
| 142465 | 11/1979 | Japan | 188/73.45 |
| 2037885 | 7/1980 | United Kingdom | 188/73.45 |
| 2142395 | 1/1985 | United Kingdom | 188/73.45 |

Primary Examiner—George E. A. Halvosa
Attorney, Agent, or Firm—James B. Raden

[57] ABSTRACT

The present invention relates to a pin guiding and/or damping element for floating-caliper spot-type disc brakes, the brake comprising a brake carrier (8) as well as a brake housing (10) which is axially slideable thereto and which straddles a brake disc and brake shoes, while the brake carrier and/or the brake housing is further provided with at least one pin (4) which is guided in a bore (12) of the housing and/or the brake carrier (8), as well as with at least one elastic guiding and/or damping portion seated in the bore. In order to accomplish a good damping as well as an improved protection for the entire guiding length of the guiding pin (4), it is provided that the guiding and damping portion (14) is furnished with a pleated bellows portion (16) at least at one of its ends, and that adjacent to this pleated bellows portion (16), there is provision of a rolling diaphragm (22).

1 Claim, 2 Drawing Sheets

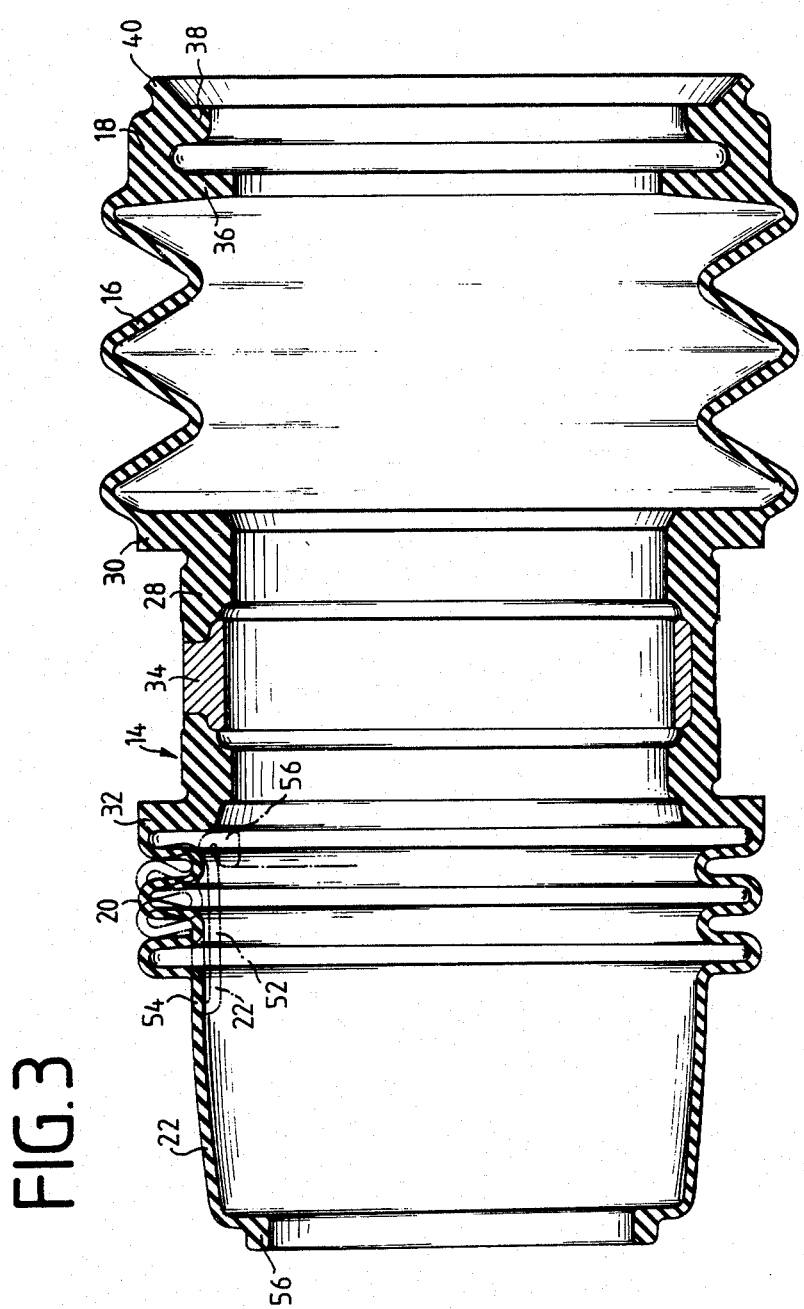

PIN GUIDING AND/OR DAMPING SLEEVE FOR FLOATING-CALIPER SPOT-TYPE DISC BRAKES

BACKGROUND OF THE INVENTION

The present invention relates to a pin guiding and/or damping sleeve for floating-caliper spot-type disc brakes, in particular for use with automotive vehicles.

A pin guiding and/or damping sleeve is known from co-pending U.S. application Ser. No. 045,214 filed Apr. 30, 1987 as a continuation of application Ser. No. 718,852 filed Apr. 2, 1985 (corresponding to W. German printed and published patent application No. 34 12 543 A1). The known damping element comprises a substantially cylindrical elastic basic body wherein a stop element is arranged which confines the movements of the pin guided in the guiding element. With the known pin guiding and/or damping element, a very good guiding and/or damping effect is achieved. Since, however, the element extends, substantially, only over the area of the bore in which it is housed, the guiding pin, which is passed through, is only covered in parts. Thus only the covered parts are protected from external influences and this is often considered to be insufficient.

SUMMARY OF THE INVENTION

It is, therefore, the object of the present invention to provide a pin guiding and/or damping element which assures an improved protection against external influences in an easy manner.

By means of the design according to the invention, a pin guiding and/or damping element is provided which permits a complete covering of the guide sliding within this element. An advantageous embodiment of the present invention provides that at one end of the damping and guiding element, a pleated bellows means with a mounting part is arranged. The mounting part can comprise a metal ring which serves as a supporting ring and which can be mounted directly onto the guiding pin and can be fixed in a specific axial position in a press fit.

Expediently, the guiding and damping element is provided with at least one radially outwardly directed projection attached to which is the pleated bellows means. In this case, a transition area is, advantageously, within the radially outer part of the projection. In this manner, the pleated bellows means can be arranged approximately within the area of the radial extension of the projection and thus requires no additional space; moreover, it leaves space for the installation of a rolling diaphragm within the area of the pleated bellows means. Such a bellows means is provided according to another favorable embodiment of the present invention. A particularly compact design is achieved, using this arrangement, when the mounting portion of the rolling diaphragm is arranged adjacent to the, substantially, cylindrical main part of the element.

According to another favorable embodiment it is provided that the pin guiding and/or damping element is furnished with a stop element confining the radial movements of the pin.

BRIEF DESCRIPTION OF THE DRAWING

An embodiment of the present invention will be described in conjunction with the accompanying drawing in which.

DETAILED DESCRIPTION OF A PREFERRED EMBODIMENT

Figure 1:
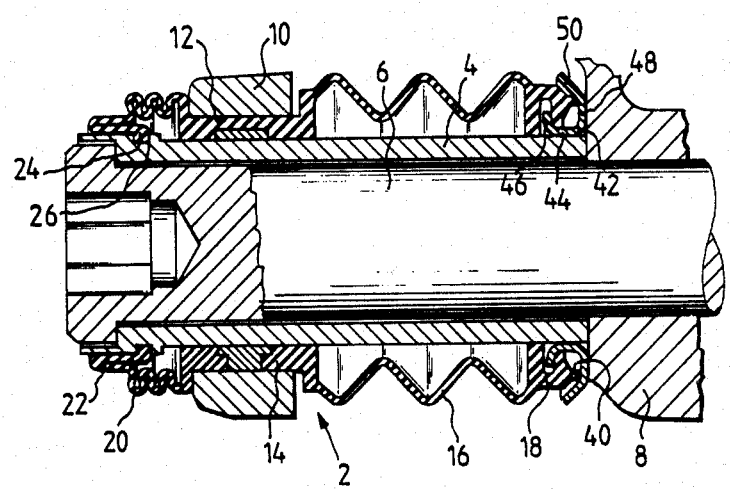
FIG. 1 is a longitudinal section of a pin guiding and/or damping element installed in the guiding system of a floating-caliper spot-type disc brake (illustrated only in part)

Reference is first made to FIG. 1 showing a pin guiding and/or damping element 2 used in a guiding system for a spot-type disc brake of an automotive vehicle. The guiding system of the disc brake comprises a guiding sleeve 4 which is clamped onto a brake carrier 8 by means of a screw 6. A brake housing which is slideably arranged at the brake carrier 8 has two eyes, one of which is illustrated in the drawing and is marked with 10. The eye 10 is provided with a bore 12 protruding through which is the guiding sleeve 4 which provides an interstice. Within said interstice, a part of the pin guiding and/or damping element 2 is arranged.

The pin guiding and/or damping element 2 comprises, substantially, five main portions. These are: the actual guiding and/or damping portion 14 arranged in the bore 12; a pleated bellows portion 16; a mounting portion 18 which is adjacent to one side of the damping portion 14; a pleated bellows portion 20; and a rolling diaphragm portion 22 which is adjacent to the other side of the damping portion 14. The rolling diaphragm portion 22 is furnished with a mounting end 24, in the form of a rib, engaging in an annular groove 26 provided at the guiding sleeve 4. The mounting portion 18 is seated directly on the outer surface of the guiding sleeve 4.

Figure 2:
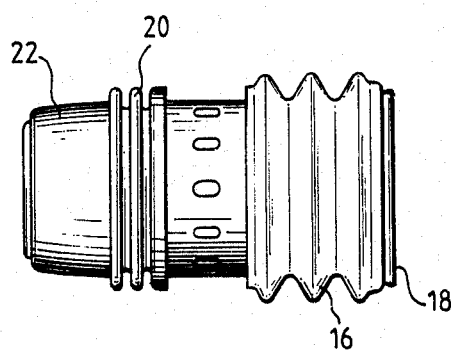
FIG. 2 is a top view of the pin guiding and/or damping element shown in FIG. 1; and, FIG. 3 is an enlarged sectional view of the pin guiding and/or damping element shown in FIG. 1.

Reference is now made to FIGS. 2 and 3. FIG. 2 illustrates a top view of the pin guiding and/or damping element 2 in a reduced scale with the rolling diaphragm portion 22 shown in its extended position. FIG. 3 illustrates an enlarged sectional view of the pin guiding and/or damping element with the pleated bellows portion 20 and the rolling diaphragm portion 22 shown in the extended position by full lines, and shown in the retracted position by dot-dash lines. The guiding and/or damping portion 14 is provided with a substantially cylindrical body 28 having radially extending flange portions 30 and 32 formed at its ends. Arranged in the central area of the body 28 is a stop element 34. The guiding and/or damping portion 14 thus corresponds, substantially, to the pin guiding and/or damping sleeve described in the above-referenced co-pending application the disclosure of which is hereby incorporated by reference. Starting from the radially outer part of the flange portion 30, the pleated bellows portion 16 is shaped at the transition area with an angle of approximately 25° to 50°. The pleated bellows portion 16 ends in the mounting portion 18 whose cross-section has almost the shape of a reversed U, with a longer limb 36 and a shorter limb 38. At the end-side face of the shorter limb 38, an outwardly inclined circumferential nose 40 is formed. As can be seen in FIG. 1, a fastening ring 42 having an almost C-shaped cross-section engages around the short limb 38. The fastening ring 42 comprises a base portion 44 which is seated on the guiding sleeve 4 with a press fit. Adjacent to the base portion 44, there is provided a short portion 46 extending into the clearance between the limbs 36 and 38. Adjacent to the other side of the base portion is a portion 48 extending in the radial direction and ending in a portion 50 extending at an angle of approximately 45° relative to the portion 48. The circumferential nose 40 closely abuts on the fastening ring 42 within the area of the portion 50. The limb 38 closely abuts on the fastening ring 42 within the area of the base portion 44 and/or the portion 46. The mounting portion 18 is rotatable relative to the fastening ring 42.

The pleated bellows portion 20 is formed at radially outermost area of the flange portion 32. The first part of said pleated bellows portion 20 which starts from the flange portion 32 extends substantially in the axial direction. The imaginary covering surface of the windings of the pleated bellows portion 20 is situated on the same radius as the outermost area of the flange portion 32. The radially inside imaginary covering surface of the windings is spaced a distance from the surface of the guiding sleeve 4 so that there is enough space to arrange the radially inner part 52 of the rolling diaphragm portion 22 underneath, as is illustrated in FIG. 1 by means of full lines and in FIG. 3 by means of dash-dot lines. That is, the rolling diaphragm portion 22 is between the inside imaginary covering surface of the windings and the outer surface of the guiding sleeve 4. The rolling diaphragm portion 22 is formed at the last (axially outermost) winding of the pleated bellows portion 20 and when in retracted position, includes a radially outer part 54 and a radially inner part 52 (see the dot-dash lines) which superimpose each other in the retracted position. The rolling diaphragm portion 22 ends in a widened mounting part or rib 56 arranged in an annular groove of the guiding sleeve 4 in a manner such that it is directly adjacent to the body 28 in the retracted position. A particularly space-saving arrangement permitting a complete covering of the entire guiding length of the guiding sleeve 4 is thus achieved.

What is claimed is:

1. A floating caliper spot-type disc brake assembly comprising a brake carrier and a brake housing slideably arranged relative thereto, a guiding sleeve having one end face bearing on said brake carrier and a screw extending through said guiding sleeve for clamping it to said brake carrier, said brake housing having an eye including a bore through which said guiding sleeve extends, a generally elastic cylindrical guiding and damping member seated on said guiding sleeve and received in said bore, said cylindrical guiding and damping member having a radially extending flange formed on each end so that each said flange is adjacent said eye, a first pleated bellows axially extending from one flange toward said brake carrier, a second pleated bellows axially extending from the other flange toward the free end of said guiding sleeve, the free end of said first bellows being formed with a mounting part having a portion thereof bearing on the outer surface of said guiding sleeve, the end of said second bellows opposite its associated flange being formed with a rolling diaphragm, the free end of the rolling diaphragm being formed with a mounting rib seated in a groove on the outer surface of said guiding sleeve, said mounting part having a generally U-shaped cross-section with unequal parallel limbs thereof extending radially inwardly relative to said guiding sleeve, the longer of said limbs sealingly engaging said sleeve, and with the connecting limb thereof extending axially of said guiding sleeve, said assembly further including a fastening ring having a generally C-shaped cross-section with one portion thereof extending radially outwardly between said parallel limbs and accepted in complimentary fashion therebetween, a second portion of said ring embracing said guiding sleeve in a press fit, a third portion of said ring bearing on said brake carrier, said short limb being positioned between said first and third portions of said ring, an outwardly inclined circumferential nose extending axially from the short limb of said mounting portion, and a fourth portion of said ring bearing on the end of said nose and forcing said shorter limb tightly axially against said one portion and radially inwardly into tight engagement with said second portion, whereby said assembly is in sealing engagement with said guiding sleeve to maintain same in a contaminant free condition.

* * * * *